United States Patent [19]

Nishikawa et al.

[11] Patent Number: 4,679,457
[45] Date of Patent: Jul. 14, 1987

[54] BACK-LASH ELIMINATING MECHANISM IN SCREW-TYPE DRIVING DEVICE

[75] Inventors: Masumi Nishikawa, Toyoake; Masanobu Ishikawa, Nagoya, both of Japan

[73] Assignee: Aisin Seiki Kabushiki Kaisha, Japan

[21] Appl. No.: 713,754

[22] Filed: Mar. 19, 1985

[30] Foreign Application Priority Data

Mar. 21, 1984 [JP] Japan .................. 59-54762

[51] Int. Cl.⁴ .................. F16H 25/24; F16H 57/12
[52] U.S. Cl. .................. 74/441; 74/89.15; 74/424.8 A; 411/433
[58] Field of Search ............ 74/409, 441, 440, 89.15, 74/424.8 A; 403/371; 411/432, 433

[56] References Cited

U.S. PATENT DOCUMENTS

| | | | |
|---|---|---|---|
| 929,851 | 8/1909 | Hess | 403/371 X |
| 1,955,954 | 4/1934 | Dumser | 74/441 |
| 2,064,921 | 12/1936 | Kinsella et al. | 403/371 X |
| 3,396,600 | 8/1968 | Zeigler et al. | |
| 4,249,426 | 2/1981 | Erikson et al. | 74/441 |
| 4,353,264 | 10/1982 | Erikson et al. | 74/441 |

FOREIGN PATENT DOCUMENTS

| | | | |
|---|---|---|---|
| 513184 | 2/1921 | France | 403/371 |
| 337159 | 2/1936 | Italy | 411/433 |
| 8000270 | 2/1980 | World Int. Prop. O. | 74/441 |
| 2060445 | 5/1981 | United Kingdom | 74/89.15 |

OTHER PUBLICATIONS

"How to Provide for Backlash in Threaded Parts", *Mechanisms, Linkages, and Mechanical Controls*, p. 189, Clifford T. Bower, c. 1985.

*Primary Examiner*—Allan D. Herrmann
*Attorney, Agent, or Firm*—Finnegan, Henderson, Farabow, Garrett & Dunner

[57] ABSTRACT

Disclosed is a back-lash eliminating mechanism in a screw-type driving device, in which a nut member is made flexible so that a screw member and the nut member can be disposed close to each other to thereby eliminate back-lash at the thread-engagement portion between the screw member and the nut member.

5 Claims, 5 Drawing Figures

BACK-LASH ELIMINATING MECHANISM IN SCREW-TYPE DRIVING DEVICE

BACKGROUND OF THE INVENTION

1. Field of the Invention

The present invention generally relates to a screw-type driving device which is constituted by a screw member, that is a screw shaft, and a nut member thread-engaged with the screw shaft, and in which the screw shaft or the nut member is rotated to thereby make them advance or retreat relative to each other, and particularly to a back-lash eliminating mechanism in such a screw-type driving device as described above, in which back-lash between the screw shaft and the nut member, which is difficult to be avoided in view of usage of thread-engagement, is eliminated.

2. Description of the Related Art

Conventionally, the screw-type driving device is arranged such that a screw shaft is rotatably supported by a fixed bracket and a nut member thread-engaged with the screw shaft is fixed to a movable bracket so as to be capable of making the movable bracket advance or retreat relatively to the fixed bracket.

When the screw shaft is rotated by rotary driving means such as a motor, or the like, the nut member is axially advanced or retreated on the screw shaft in accordance with the rotation thereof. Thus, the position of the nut member, that is the position of the movable bracket, relative to the fixed bracket is adjusted. Moreover, if rotation transmitting means is stopped, the nut member is fixed to the screw shaft because the former is thread-engaged with the latter. Further, there are two other kinds of screw-type driving devices, one being arranged such that a nut member is rotatably supported by a bracket and a screw shaft is fixed to another bracket, the other being arranged such that a nut member is made shaft-like and a screw shaft is made to be a mere screw member.

In the screw-type driving device of this kind, however, back-lash between the screw shaft and the nut member is unavoidable because of usage of a thread engagement. For this, the movable bracket may chatter relative to the fixed bracket. Accordingly, conventionally, there has been proposed a back-lash eliminating mechanism in which a ball screw was disposed in the thread-engagement portions between the screw shaft and the nut member in order to eliminate back-lash. Thus, the screw-type driving device were made larger in size because of its complex structure. Further, the device was expensive because of requirement of high machining accuracy.

SUMMARY OF THE INVENTION

In view of the foregoing, it is an object of the present invention to eliminate the disadvantages in the conventional screw-type driving device.

It is another object of the present invention to provide a back-lash eliminating mechanism in a screw-type driving device, in which a nut member is made flexible so that a screw member and the nut member can be disposed close to each other to thereby eliminate back-lash at the thread-engagement portion between the screw member and the nut member.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To attain the above-mentioned objects, according to the present invention, the back-lash eliminating mechanism in a screw-type driving device is featured in that slits are axially formed in a nut member and the outer surface of the nut member is tapered so that the nut member is attached to a bracket through the tapered surface.

Owing to this structural feature, the nut member is given flexibility because of the axially formed slits so that the nut member is elastically deformable inward as well as outward. The nut member having slits formed therein and having its outer surface tapered is attached on the bracket through the tapered surface, so that the nut member is inwardly elastically deformed and the diameter thereof is reduced, whereby the nut member is fixedly thread-engaged with the screw member in the state both the members are arranged close to each other. Accordingly, back-lash at the thread-engagement portion between the screw member and the nut member can be eliminated.

Thus, back-lash at the thread-engagement portion between the screw member and the nut member can be eliminated by such a simple arrangement that slits are formed in the nut member and the outer surface of the member is tapered, thereby enabling the screw-type driving device to be reduced in size as well as cost.

BRIEF DESCRIPTION OF THE DRAWINGS

The present invention will be apparent from the following detailed description taken in conjunction with the accompanying drawings, which are incorporated in and constitute a part of this specification, in which.

DETAILED DESCRIPTION OF PREFERRED EMBODIMENT

Figure 1:
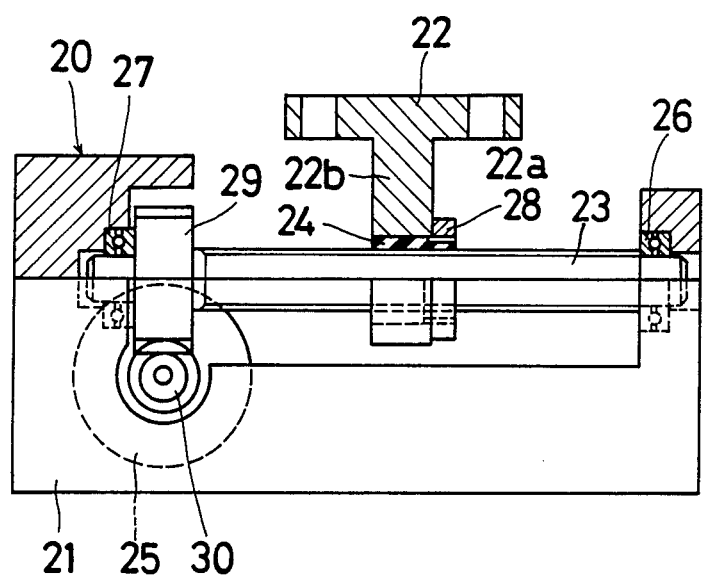
FIG. 1 is a front view, partly in section, showing an embodiment according to the present invention.

Referring to the drawings, an embodiment according to the present invention will be described hereunder. Throughout the drawings, like reference characters are used to designate like elements.

As shown in FIG. 1, a screw-type driving device 20 is provided with a fixed bracket 21, a movable bracket 22 which is advanced or retreated relative to the fixed bracket 21 in the right or left direction in the drawing, a screw shaft 23 rotatably mounted on the fixed bracket 21, and a nut 24, that is a nut member, thread-engaged with the screw shaft 23 and integrally attached on the movable bracket 22. Further, guide means (not shown) is disposed between the fixed bracket 21 and the movable bracket 22, so that the movable bracket 22 can be advanced or retreated in the axial direction of the screw shaft 23.

The fixed bracket 21 has a U-like shape in cross section and the opposite ends of the screw shaft 23 are supported at the opposite ends of the fixed bracket 21 through bearing means 26 and 27, respectively. For this, the screw shaft 23 is movable about the axis of the shaft 23, while it is axially fixed to the fixed bracket 21. A worm wheel 29 is fixed to the screw shaft 23 at its left end as shown in FIG. 1 and meshed with a worm gear 30 of a motor 25 disposed in the bracket 21. Accordingly, the screw shaft 23 is rotated right or left about the axis as the motor 25 rotates.

Figure 2:
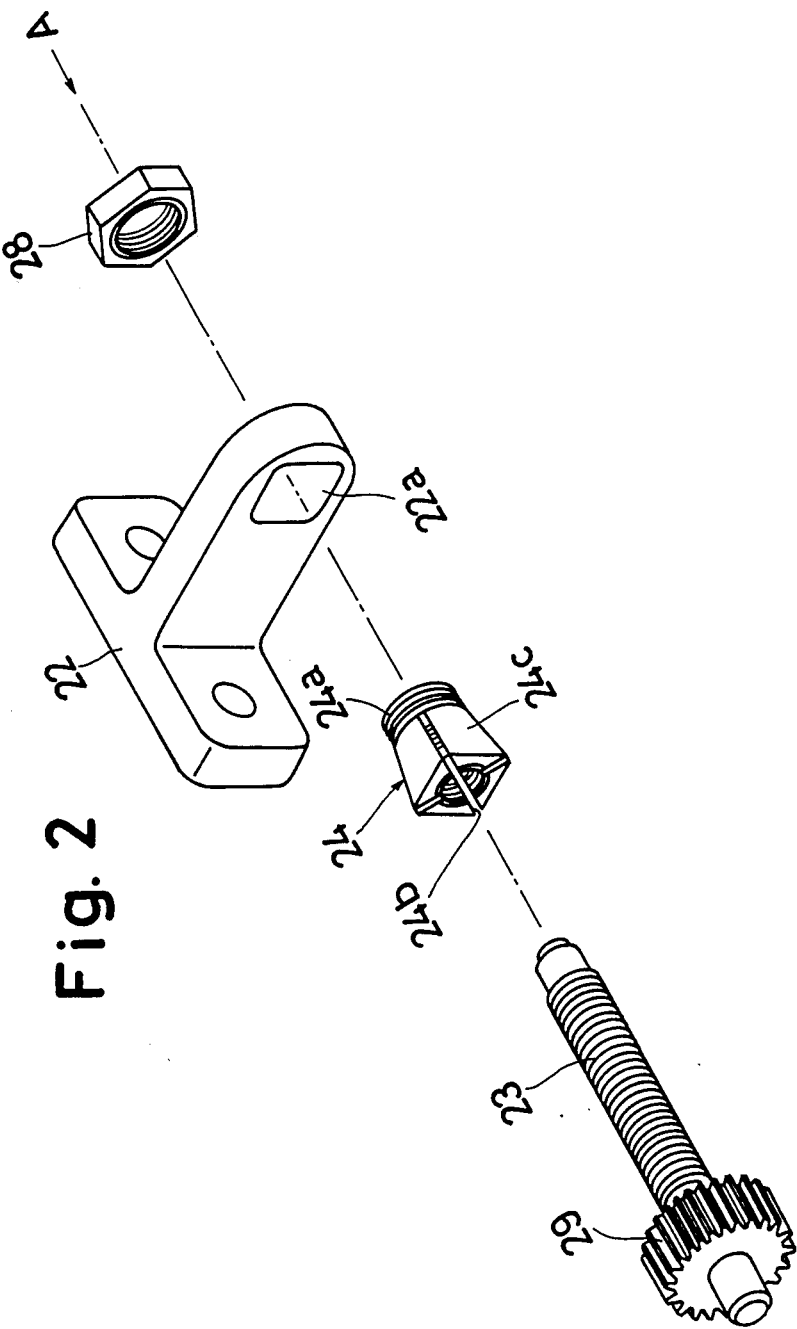
FIG. 2 is an exploded perspective view showing the embodiment of FIG. 1.

The nut 24, thread-engaged with the screw shaft 23, is made of a synthetic resin material, and has a shape of a quadrilateral-circular cone frustum with the left end surface, in the drawing, as its bottom with respect to the axial direction of the screw shaft 23, as shown in FIG. 2. A male screw portion 24a is formed in the nut 24 at its right end outer surface. Slits 24b are formed in the nut 24 along the respective ridgelines of the quadrilateral-circular cone frustum portion. Thus, each side surface 24c of the quadrilateral-circular cone frustum portion of the nut 24 is flexibly inwardly deformable because the nut 24 is made of a synthetic resin material and formed with the slits 24b.

Figure 3:
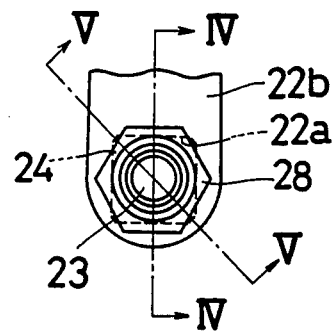
FIG. 3 is a partial side view showing the embodiment of FIG. 1.
Figure 4:
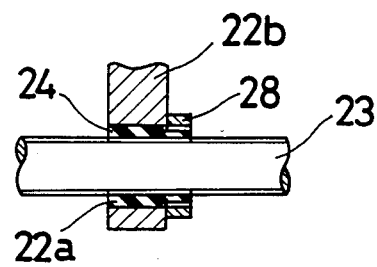
FIGS. 4 and 5 are partial sectional views taken on lines IV—IV and V—V of FIG. 3 respectively.
Figure 5:
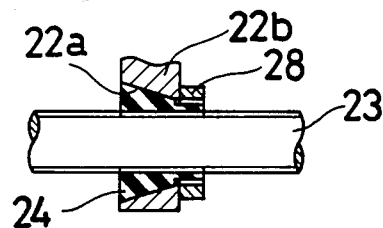

The movable bracket 22 on which the nut 24 is attached, is provided with an arm portion 22b as shown in FIG. 3, and a hole 22a tapered and shaped into a quadrilateral-circular cone frustum, to which the nut 24 is to be fittingly engaged, is formed in the arm portion 22b as shown in FIGS. 4 and 5. The male screw portion 24a of the nut 24 is projected outward through the tapered hole 22a in the state in which the nut 24 has been fittingly engaged with the tapered hole 22a. A hexagonal nut 28 is thread-engaged with the male screw portion 24a.

As shown in FIG. 5, when the hexagonal nut 28 is deeply thread-engaged with the male screw portion 24a, the respective side surfaces 24c of the quadrilateral-circular cone frustum portion of the nut 24 abut on the tapered hole 22a at its wall surface. Since the side surfaces 24c of the quadrilateral-circular cone frustum portion of the nut 24 is inwardly deformed and reduced in diameter, the thread-engagement surface of the nut 24 is made close to the thread-engagement surface of the screw shaft 23. The degree of the thread-engagement of the hexagonal nut 28 with the male screw portion 24a is suitably adjusted, so that the nut 24 is rotatably thread-engaged with the screw shaft 23 in the state in which no back-lash occurs.

Further, since both the nut 24 and the tapered hole 22a in which the nut 24 is fitted, are formed in the shape of a quadrilateral-circular cone frustum with respect to the axial direction of the screw shaft 23, the nut 24 fitted in the tapered hole 22a is prevented from rotating about the axial direction of the screw shaft 23. Accordingly, it is possible that the screw shaft 23 is rotated by large torque.

Since the nut 24 of the synthetic resin material is used, wear of the screw shaft 23 is reduced, and, moreover, noises are prevented from occurring between the thread-engagement surfaces of the nut 24 and the screw shaft 23.

An elastic material may be disposed between the hexagonal nut 28 and the arm portion 22b of the movable bracket 22, so that the closed state of the nut 24 to the screw shaft 23 is maintained by the deformation of the elastic material even if the thread-engagement surface of the nut 24 was worn away. In this case, a C-ring may be used in place of the hexagonal nut 28 because of unnecessary of adjustment.

Next, operations of the embodiment as described above will be described hereunder. Upon rotating the motor 25, the screw shaft 23 is rotated through the worm gear 30 and the worm wheel 29. The nut 24 is axially advanced or retreated on the screw shaft 23 depending on the rotating direction of the screw shaft 23, so that the movable bracket 22 holding the nut 24 is advanced or retreated relative to the fixed bracket 21. When the movable bracket 22 has been displaced into a desired position, the motor 25 is stopped. At this time, since the worm wheel 29 is meshed with the worm gear 30, the screw shaft 23 is made to be in its fixed state relative to the fixed bracket 21. Further, being thread-engaged with the screw shaft 23, the nut 24 is made to be in its fixed state relative to the screw shaft 23. Thus, it is possible that the movable bracket 22 is adjusted and maintained in a desired position relative to the fixed bracket 21.

Further, the nut 24 made capable of being reduced in diameter by the axially formed slits 24b has its outer surface shaped into a quadrilateral-circular cone frustum and the respective side surfaces 24c of the frustum are axially tapered. The nut 24 is fitted into the tapered hole 22a of the movable bracket 22 shaped into also a quadrilateral-circular cone frustum and the side surfaces of the nut 24 are caused to abut on the tapered hole 22a by the hexagonal nut 28. Thus, the nut 24 is reduced in diameter because the respective side surfaces 24c thereof are deformed inwardly so that the thread-engagement surface of the nut 24 is located close to the thread-engagement surface of the screw shaft 23. Accordingly, it is possible to easily eliminate back-lash at the thread-engagement position between the nut 24 and the screw shaft 23 by adjusting only the depth of the engagement of the hexagon nut 28, so that the movable bracket 22 does not chatter relative to the fixed bracket 21.

The screw-type driving device according to the present invention is suitable, for example, for a driving portion of a power telescopic steering column used for vehicles, particularly for cars.

It will be apparent to those skilled in the art that modifications and variations can be made in the back-lash eliminating mechanism of this invention. The invention in its broader aspects is, therefore, not limited to the specific details, representative apparatus, and illustrative examples shown and described above. Thus, it is intended that all matter contained in the foregoing description or shown in the accompanying drawings shall be interpreted as illustrative and not in a limiting sense.

What is claimed is:

1. A back-lash eliminating screw-type driving device comprising:
   a first bracket;
   a second bracket movable relative to said first bracket, said second bracket having a generally prismoidal tapered hole therethrough, said hole being rectangular in cross section;
   a screw member rotatably disposed on said first bracket;
   a first nut member threadable engaging said screw member and disposed in said hole of said second blanket, said first nut member having an outer surface including a generally prismoidal tapered portion being rectangular in cross section and corresponding to the configuration of said generally prismoidal tapered hole and an integral threaded portion extending from the narrower end of said tapered portion, said first nut member also having axially and radially extending slits, one of said slits intersecting each corner of said outer surface of said prismoidal portion, said tapered portion and said tapered hole being dimensioned such that said tapered portion of said first nut member slidably fits in said tapered hole and said threaded portion extends out of said tapered hole beyond the narrower end of said hole; and a second nut member threadable engaging said threaded portion of said first nut member for drawing said first nut member axially within said tapered hole to urge opposing sides of said outer surface toward one another to cause said nut member to threadable engage said screw member more firmly.

2. A back-lash eliminating screw-type driving device according to claim 1 further comprising driving means for rotating one of said screw member and said first nut member to displace said first bracket relative to said second bracket.

3. A back-lash eliminating screw-type driving device according to claim 2, wherein said screw member is a screw shaft disposed along the axial direction of said first nut member.

4. A back-lash eliminating screw-type driving device according to claim 2, wherein said first bracket is fixed and said second bracket is movable.

5. A back-lash eliminating device according to claim 1, wherein said first nut member is comprised of synthetic resin.

* * * * *